United States Patent
Jeong et al.

(10) Patent No.: US 9,231,254 B2
(45) Date of Patent: Jan. 5, 2016

(54) BINDER COMPOSITION FOR ELECTRODE, ELECTRODE FOR SECONDARY BATTERY AND SECONDARY BATTERY INCLUDING THE SAME

(71) Applicant: SAMSUNG SDI CO., LTD., Yongin-si, Gyeonggi-do (KR)

(72) Inventors: Hyesun Jeong, Yongin-si (KR); Beomwook Lee, Yongin-si (KR); Hyeran Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 188 days.

(21) Appl. No.: 14/140,229

(22) Filed: Dec. 24, 2013

(65) Prior Publication Data

US 2014/0255777 A1    Sep. 11, 2014

(30) Foreign Application Priority Data

Mar. 8, 2013    (KR) .................. 10-2013-0025308

(51) Int. Cl.
*H01M 4/62* (2006.01)
*C08L 33/08* (2006.01)
*H01M 4/13* (2010.01)
*H01M 4/133* (2010.01)
*H01M 4/134* (2010.01)
*H01M 4/1393* (2010.01)
*H01M 4/1395* (2010.01)
*H01M 4/139* (2010.01)

(52) U.S. Cl.
CPC .............. *H01M 4/622* (2013.01); *C08L 33/08* (2013.01); *H01M 4/133* (2013.01); *H01M 4/134* (2013.01); *H01M 4/1393* (2013.01); *H01M 4/1395* (2013.01); *H01M 4/13* (2013.01); *H01M 4/139* (2013.01); *Y02E 60/122* (2013.01)

(58) Field of Classification Search
CPC ...... H01M 4/622; H01M 4/133; H01M 4/134; H01M 4/1393; H01M 4/1395; H01M 4/13; H01M 4/139; C08L 33/08; Y02E 60/122
USPC ..................................... 429/211; 524/558, 45
See application file for complete search history.

(56) References Cited

U.S. PATENT DOCUMENTS

2009/0257171 A1* 10/2009 Yamazaki et al. ............ 361/502
2011/0091771 A1*  4/2011 Sannan et al. ................ 429/217

FOREIGN PATENT DOCUMENTS

| EP | 2 048 726 A1 | 4/2009 |
| EP | 2 284 235 A1 | 2/2011 |
| JP | 2004-281055 A | 10/2004 |
| JP | 2010-177060 A | 8/2010 |
| KR | 10-2009-0110133 A | 10/2009 |
| WO | WO 2012/029328 A2 | 3/2012 |

OTHER PUBLICATIONS

EPO Search Report dated Aug. 6, 2014, for corresponding European Patent application 14155979.9, (7 pages).
English Machine Translation of Japanese Patent Application No. 2004-281055 A, pp. 1-49.
English Machine Translation of Japanese Patent Application No. 2010-177060 A, pp. 1-21.

* cited by examiner

*Primary Examiner* — Michael M Bernshteyn
(74) *Attorney, Agent, or Firm* — Christie, Parker & Hale, LLP (57) ABSTRACT

A water-soluble binder composition including a first polymer having one or more hydroxyl groups in its repeating unit, and a polybasic acid compound. The binder composition is for an electrode and is environmentally friendly, has improved cycle life characteristics, and has improved adhesion strength of an active material and improved adhesion strength of the active material to a current collector. An electrode including the binder composition and a secondary battery including the electrode, are also provided.

16 Claims, 1 Drawing Sheet

BINDER COMPOSITION FOR ELECTRODE, ELECTRODE FOR SECONDARY BATTERY AND SECONDARY BATTERY INCLUDING THE SAME

CROSS-REFERENCE TO RELATED APPLICATION

This application claims priority to and the benefit of Korean Patent Application No. 10-2013-0025308, filed on Mar. 8, 2013, the entire content of which is incorporated herein by reference.

BACKGROUND

1. Field

Embodiments of the present invention relate to a binder composition for an electrode, an electrode for a secondary battery and a secondary battery including the same.

2. Description of the Related Art

As mobile equipment is becoming smaller, lighter, and highly functional, there is gradually an increasing demand for secondary batteries having high capacity and long life span.

To cope with such demand, development of materials and preparation processes of a positive electrode for achieving high capacity are currently underway by preparing high-capacity active materials, increasing the concentration of electrode slurry compositions and forming a thick film. In addition, many studies of active materials of a negative electrode for replacing conventional active materials, e.g., graphite-based materials with silicon, a silicon-silicon oxide composite based material, a silicon-graphite composite based material, a tin based material, or alloys thereof, capable of high capacity, are being conducted.

In order to improve capacity, cycle life characteristics, and stability of a secondary battery, development of other materials of the secondary battery, including an electrolyte, a separator and a binder, as well as positive and negative electrode materials, is being actively conducted.

Further, in order to achieve high capacity, research on binder materials, such as conductive polymers, is also underway to reduce an amount of a conductive agent and to increase an amount of an active material, thereby increasing the capacity.

However, conventional binders typically have poor adhesion to an active material and to a current collector as well as low tensile strength, resulting in degradation of a cycle life characteristic. Additionally, since conventional binders typically employ an organic soluble binder material, rather than a water-soluble binder material, the conventional binders are not environmentally friendly. In order to apply conventional binders to a production line, it is necessary to change the water-based process applied to the existing negative electrode production line.

SUMMARY

Aspects of embodiments of the present invention, are directed toward a water-soluble binder composition for an electrode, including a first polymer having one or more hydroxyl groups in its repeating unit, and a polybasic acid or polyfunctional acid compound, which is environmentally friendly, has improved cycle life characteristics, and avoids or reduces deformation of an electrode during expansion or shrinkage of an active material due to improved dispersibility of a hydroxyl group to a current collector and the active material, improved adhesion strength of the polybasic acid to the current collector and the active material, and increased tensile strength due to a crosslinking reaction between the hydroxyl group and polybasic acid during formation of the electrode.

Aspects of embodiments of the present invention, are also directed toward an electrode including the binder and a secondary battery including the electrode, the secondary battery having improved cycle life characteristics by avoiding or reducing deformation of an electrode during expansion or shrinkage of an active material due to the binder imparting improved adhesion strength to a current collector and a positive active material (e.g. by providing improved dispersibility of a hydroxyl group to a current collector and the active material), improved electrochemical stability to a positive electrode, improved adhesion strength to a current collector and a negative active material, and increased tensile strength of a negative electrode (e.g. due to a crosslinking reaction between a hydroxyl group and a polybasic acid during formation of the electrode).

Aspects of embodiments of the present invention are also directed toward an electrode for a secondary battery and a secondary battery, which is environmentally friendly while having improved cycle life characteristics.

As described above, according to embodiments the present invention, since the binder composition for an electrode of a secondary battery is water-soluble and uses a polymer having hydroxyl groups in its repeating unit, and a polybasic acid or polyfunctional acid compound, deformation of an electrode does not (or substantially does not) occur during expansion or shrinkage of an active material by imparting improved adhesion strength to a current collector and a positive active material and improved electrochemical stability to a positive electrode, and imparting improved adhesion strength to a current collector and a negative active material and increased tensile strength to a negative electrode (e.g. due to a crosslinking reaction between hydroxyl group of the binder and carboxyl group of polybasic acid during a vacuum drying process in the course of forming the electrode), thereby improving cycle life characteristics of the secondary battery. In addition, since the binder composition is water-soluble, it is environmentally friendly.

In an embodiment, binder composition for an electrode is provided. The binder composition includes a first polymer having one or more hydroxyl groups in its repeating unit; and a polybasic acid compound or polybasic acid compound precursor, wherein the polybasic acid compound is a compound having three or more carboxyl groups and the polybasic acid compound precursor is a compound that is soluble in water and is configured to be converted into a polybasic compound having three or more carboxyl groups, in water.

In one embodiment, the first polymer is soluble in water or is dissolved in water.

In one embodiment, the first polymer includes two or more different polymers, and each of the two or more different polymers have a different structure or have the same structure with different molecular weights.

In one embodiment, the first polymer includes at least one polymer selected from the group consisting of carboxymethylcellulose, carboxyethylcellulose, ethylcellulose, hydroxymethylcellulose, hydroxyethylcellulose, hydroxypropylcellulose, polyvinyl alcohol, and salts thereof.

In one embodiment, the first polymer includes one or more copolymers prepared by copolymerizing a monomer having a hydroxyl group and a monomer having no hydroxyl group.

In one embodiment, the monomer having the hydroxyl group is selected from at least one of 2-hydroxyethylmethacrylate, 2-hydroxymethylmethacrylate, 3-hydroxypropylacrylate, and 3-hydroxypropylmethacrylate.

In one embodiment, the polybasic acid compound includes at least one compound selected from the group consisting of a tricarboxylic acid selected from methane tricarboxylic acid, ethane tricarboxylic acid, citric acid, benzene-1,3,5-tricarboxylic acid, and 5-sulfo-1,2,4-benzenetricarboxylic acid; a tetracarboxylic acid selected from ethane-1,1,2,2-tetracarboxylic acid, propane-1,1,2,3-tetracarboxylic acid, butane-1,2,3,4-tetracarboxylic acid, cyclopentane-1,2,3,4-tetracarboxylic acid, and benzene-1,2,4,5-tetracarboxylic acid; benzene-1,2,3,4,5-pentacarboxylic acid; benzene-1,2,3,4,5,6-hexacarboxylic acid (mellitic acid); an aliphatic dianhydride selected from 1,2,3,4-cyclobutane tetracarboxylic dianhydride, 1,2,3,4-cyclopentane tetracarboxylic dianhydride and 5-(2,5-dioxotetrahydrofuril)-3-methylcyclohexane-1,2-dicarboxylic dianhydride; an alkylene glycolbisanhydrotrimellitate selected from trimellitic anhydride, pyromellitic dianhydride, ethylene glycolbisanhydrotrimellitate, propylene glycolbisanhydrotrimellitate, 1,4-butanediolbisanhydrotrimellitate, hexamethylene glycolbisanhydrotrimellitate, polyethylene glycolbisanhydrotrimellitate, and polypropylene glycolbisanhydrotrimellitate; an aromatic acid dianhydride compound and an aromatic-aliphatic combination type acid dianhydride compound selected from 3,3',4,4'-benzophenonetetracarboxylic anhydride, 3,3',4,4'-biphenyltetracarboxylic anhydride, 1,2,5,6-naphthalene tetracarboxylic anhydride, 1,4,5,8-naphthalene tetracarboxylic anhydride, 2,3,5,6-pyridine tetracarboxylic anhydride, 3,4,9,10-periylene tetracarboxylic anhydride, 3,3',4,4'-diphenylsulfone tetracarboxylic anhydride, m-terphenyl-3,3',4,4'-tetracarboxylic anhydride, 4,4'-oxydiphthalc dianhydride, 1,1,1,3,3,3-hexafluoro-2,2-bis(2,3- or 3,4-dicarboxyphenyl)propane dianhydride, 2,2-bis(2,3- or 3,4-dicarboxyphenyl)propane dianhydride, 2,2-bis[4-(2,3- or 3,4-dicarboxyphenoxy)phenyl]propane dianhydride, 1,1,1,3,3,3-hexafluoro-2,2-bis[4-(2,3- or 3,4-dicarboxyphenoxy)phenyl]propane dianhydride, and 1,3-bis(3,4-dicarboxyphenyl)-1,1,3,3-tetramethyldisiloxane dianhydride.

In one embodiment, the first polymer and the polybasic acid compound are in an amount of 1 to 50 parts by weight of the polybasic acid compound based on 100 parts by weight of the first polymer.

In one embodiment, the binder composition further includes a second polymer, the second polymer being a water-based binder.

In one embodiment, the first polymer is in an amount of 20 to 100 parts by weight based on a total weight of the first polymer and the second polymer.

In one embodiment, the second polymer comprises at least one selected from the group consisting of polyacrylic acid, polymethacrylic acid, polyacrylic acid copolymer, polymethacrylic acid copolymer, polyacrylamide, polyacrylamide copolymer, (denatured) butadiene-based rubber emulsion, (denatured) styrene-butadiene-based rubber emulsion, and (denatured) urethane-based rubber emulsion.

In one embodiment, the binder further includes at least one additive selected from the group consisting of a crosslinking promoter, a dispersing agent, a thickener, a conductive agent and a filler.

In one embodiment, the additive is in an amount of 0.1 to 10 parts by weight based on 100 parts by weight of the binder composition, not including a solvent.

In one embodiment, the crosslinking promoter is an acid having higher acidity than a carboxylic acid.

In one embodiment, the crosslinking promoter is an organic sulfonic acid.

In one embodiment, the binder composition comprises at least one solvent selected from the group consisting of water, N,N-dimethylformamide, N,N-dimethylacetamide, methylethylketone, cyclohexanone, aceticethyl, aceticbutyl, cellosolveacetate, propyleneglycol monomethylether acetate, methylcellosolve, butylcellosolve, methylcarbitol, butylcarbitol, propyleneglycol monomethylether, diethyleneglycol dimethylether, toluene, and xylene.

In another embodiment, an electrode for a secondary battery is provided. The electrode includes an electrode current collector; an electrode active material; and the binder composition.

In another embodiment, a secondary battery is provided. The secondary battery includes a positive electrode; a negative electrode; a separator between the positive electrode and the negative electrode; and an electrolytic solution, wherein at least one of the positive electrode or the negative electrode comprises the binder.

Additional aspects and/or advantages of embodiments of the invention will be set forth in part in the following detailed description.

BRIEF DESCRIPTION OF THE DRAWINGS

The accompanying drawing, together with the specification, illustrate embodiments of the present invention and to explain the principles of the present invention.

DETAILED DESCRIPTION

In the following detailed description, only certain embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Like reference numerals designate like elements throughout the specification.

Hereinafter, embodiments of the present invention will be described in detail also with reference to the accompanying drawing.

A binder composition for an electrode according to an embodiment of the present invention includes a first polymer having one or more hydroxyl groups in its repeating unit and a polybasic acid compound, also referred to as a polyfunctional acid compound.

<Binder Composition for Electrode>

According to an embodiment of the present invention, a first polymer (polymer (A)), includes a water-soluble polymer (A1), a polymer dispersed in water (A2), or a combination thereof.

Examples of the water-soluble polymer (A1) include, but are not limited to at least one selected from the group consisting of carboxymethyl cellulose, carboxyethyl cellulose, ethyl cellulose, hydroxymethyl cellulose, hydroxyethyl cellulose, hydroxypropyl cellulose, polyvinylalcohol, and salts thereof.

In one embodiment, polymer (A2) dispersed in water is prepared by emulsion polymerization or suspension polymerization. In one embodiment, the polymer (A2) is a copolymer including at least one selected from the group consisting of copolymers prepared by copolymerizing one or more of a monomer having a hydroxyl group, such as 2-hydroxyethylacrylate, 2-hydroxyethylmethacrylate, 3-hydroxypropylacrylate, 3-hydroxypropylmethacrylate, or 4-hydroxystyrene, with one or more of a monomer having no hydroxyl group. That is, in one embodiment, the polymer (A2) is a copolymer derived from one or more of a monomer having a hydroxyl group and one or more of a monomer having no hydroxyl group, and thus is a copolymer having repeating units which correspond to these monomers. In one embodiment, either one of polymer (A1) or polymer (A2) is used alone, and in another embodiment, polymer (A1) and polymer (A2) are used in combination.

In one embodiment, the polybasic acid compound (B) includes a compound (B1) having three or more carboxyl (—COOH) groups in its molecule or includes a compound (B2) capable of being converted into the compound (B1) having three or more carboxyl (—COOH) groups in its molecule when it is dissolved in water. That is, the compound (B2) is polybasic acid compound precursor, configured to be converted into a polybasic compound having three or more carboxyl (—COOH) groups, in water.

Examples of the compound (B1) include at least one selected from the group consisting of a tricarboxylic acid selected from methane tricarboxylic acid, ethane tricarboxylic acid, citric acid, benzene-1,3,5-tricarboxylic acid, and 5-sulfo-1,2,4-benzenetricarboxylic acid; a tetracarboxylic acid selected from ethane-1,1,2,2-tetracarboxylic acid, propane-1,1,2,3-tetracarboxylic acid, butane-1,2,3,4-tetracarboxylic acid, cyclopentane-1,2,3,4-tetracarboxylic acid, and benzene-1,2,4,5-tetracarboxylic acid; benzene-1,2,3,4,5-pentacarboxylic acid; benzene-1,2,3,4,5,6-hexacarboxylic acid (mellitic acid); an aliphatic dianhydride selected from 1,2,3,4-cyclobutane tetracarboxylic dianhydride, 1,2,3,4-cyclopentane tetracarboxylic dianhydride, and 5-(2,5-dioxotetrahydrofuril)-3-methylcyclohexane-1,2-dicarboxylic dianhydride; and an alkyleneglycolbisanhydrotrimellitate selected from trimellitic anhydride, pyromellitic dianhydride, ethyleneglycolbisanhydrotrimellitate, propyleneglycolbisanhydrotrimellitate, 1,4-butanediolbisanhydrotrimellitate, hexamethyleneglycolbisanhydrotrimellitate, polyethyleneglycolbisanhydrotrimellitate, and polypropyleneglycolbisanhydrotrimellitate.

Examples of the compound (B2) include a compound having three or more carboxyl groups in its molecule when it is dissolved in water, that is, a compound that is configured to be converted into a polybasic acid in water, such as an acid anhydride. Specific examples of suitable acid anhydrides include, but are not limited to at least one selected from the group consisting of: aliphatic dianhydrides, such as 1,2,3,4-cyclobutane tetracarboxylic anhydride, or 1,2,3,4-cyclopentane tetracarboxylic anhydride; trimellitic anhydride; pyromellitic dianhydride; alkyleneglycolbisanhydrotrimellitates, such as ethyleneglycolbisanhydrotrimellitate, propyleneglycolbisanhydrotrimellitate, 1,4-buthane diol bisanhydrotrimellitate, hexamethylene glycolbisanhydrotrimellitate, polyethyleneglycolbisanhydrotrimellitate, or polypropyleneglycolbisanhydrotrimellitate; aromatic acid dianhydride compounds, such as 3,3',4,4'-benzophenone tetracarboxylic anhydride, 3,3',4,4'-biphenyltetracarboxylic anhydride, 1,2,5,6-naphthalenetetracarboxylic anhydride, 1,4,5,8-naphthalenetetracarboxylic anhydride, 2,3,5,6-pyridine tetracarboxylic anhydride, 3,4,9,10-perylene tetracarboxylic anhydride, 3,3',4,4'-diphenyl sulfone tetracarboxylic anhydride, or m-terphenyl-3,3',4,4'-tetracarboxylic anhydride; and combinations of aromatic and aliphatic dianhydride compounds.

In one embodiment, the first polymer (A) and the polybasic acid compound (B) are mixed in a ratio of 1 to 50 parts by weight of the polybasic acid compound (B) based on 100 parts by weight of the first polymer A. If an amount of the polybasic acid compound B is 1 part by weight or more, desired characteristics according to some embodiments of the present invention can be obtained. If the amount of the polybasic acid compound (B) exceeds 50 parts by weight, it can be difficult to prepare a slurry having stability.

In some embodiments, the first polymer (A) is a single-component polymer. In other embodiments, the first polymer (A) is a multi-component polymer (i.e. including two or more different polymers (A)). In some embodiments, the two or more different polymers (A) have a different structure (that is, having different repeating units) or have the same structure (that is, having the same repeating units) with different molecular weights.

In some embodiments, the polybasic acid compound (B) is single-component (that is, including only one of a polybasic compound). In other embodiments, the polybasic acid compound (B) in multi-component (that is, including two or more polybasic acid compounds (B)).

In some embodiments, in forming an electrode, the first polymer (A) is used alone or in combination with a polymer suitable for improving dispersibility of the active material, increasing adhesion strength of the active material to the current collector and/or enhancing elasticity. In some embodiments, yet another polymer (to be referred to as a second polymer, hereinafter) is used in combination with the first polymer (A) and/or in combination with the first polymer (A) and the polymer suitable for improving dispersibility of the active material, increasing adhesion strength of the active material to the current collector and/or enhancing elasticity. In some embodiments, the second polymer is a water-based polymer, such as a water-soluble binder or a binder dispersed in water. In some embodiments, the first polymer is in an amount of 20 to 100 parts by weight based on 100 parts by weight of the first polymer and the second polymer, to achieve characteristics in accordance with embodiments of the present invention.

Examples of the second polymer include, but are not limited to at least one selected from the group consisting of polyacrylic acid, polymethacrylic acid, polyacrylic acid copolymer, polymethacrylic acid copolymer, polyacrylamide, polyacrylamide copolymer, polytetrafluoroethylene (PTFE), polyvinylidenefluoride (PVDF), polyvinylidenefluoride-co-hexafluoropropylene (P(VDF-co-HFP)), (denatured) butadiene-based rubber emulsion, (denatured) styrene-butadiene-based rubber emulsion, (denatured) butylnitrile rubber emulsion and (denatured) urethane-based rubber emulsion.

<Other Additives>

In addition to the water-soluble polymer binder, the binder composition according to some embodiments of the present invention further includes one or more additives for improving additional characteristics.

Examples of additives include, but are not limited to a crosslinking promoter, a dispersing agent, a thickener, a conductive agent and a filler. In some embodiments, the one or more additives are mixed with the binder composition in preparing slurry for forming an electrode, and then used in this way. In some embodiments, the one or more additives are separately prepared and then independently used. Suitable additives can be selected in accordance with a particular active material and/or binder components. In some embodiments, the one or more additives are not used.

In some embodiments, an amount of each of the one or more additives is selected in accordance with a kind of active material used, components of binder used and a kind of additive used. In some embodiments, of the one or more additives is used in an amount of 0.1 to 10 parts by weight based on the weight of the binder composition, not including a solvent. If the amount of the additive used is less than 0.1 parts by weight, the one or more additives used may not provide a suitable effect. If the amount of the additive used is greater than 10 parts by weight, a proportion of the water-soluble polymer binder relative to the binder composition for a negative electrode is lowered, thus making it difficult to obtain desired properties.

In some embodiments, the crosslinking promoter is one or more selected from acids having higher acidity than carboxylic acid. Examples of the crosslinking promoter include, but are not limited to strong acids, such as sulfuric acid, chloric acid or nitric acid diluted in water, and acids such as sulfurous acid, nitrous acid or acetic acid. In some embodiments, organic sulfonic acids, such as benzene sulfonic acid, p-toluene sulfonic acid or sulfosuccinic acid, are used. In these embodiments, adjusting the amount of the crosslinking promoter can be more easily performed.

In some embodiments, the dispersing agent is selected from materials suitable for improving dispersibility of a positive or negative electrode active material and a conductive agent in a slurry. In some embodiments, the dispersing agent is selected from a cationic dispersing agent, an anionic dispersing agent, and a nonionic dispersing agent. In some embodiments, the dispersing agent is at least one selected from a hydrocarbon having 5 to 20 carbon atoms in its lipophilic part, an acryl oligomer, an ethylene oxide oligomer, a propylene oxide oligomer, an ethylene oxide oligomer, a propylene oxide oligomer, and a urethane oligomer.

In some embodiments, and particularly those in which the viscosity of a slurry is low, a thickener is added to facilitate coating of the slurry on a current collector. Examples of the thickener include but are not limited to at least one selected from the group consisting of carboxymethyl cellulose, carboxyethyl cellulose, ethyl cellulose, hydroxymethyl cellulose, hydroxyethyl cellulose, hydroxypropyl cellulose, and polyvinylalcohol. In some embodiments, informing a negative electrode, most of the dispersing agent and the thickener are thermally decomposed at a vacuum drying temperature in a range of 250° C. to 400° C. Thus, the thickener in these embodiments is used in a small amount and only when necessary.

In some embodiments, the conductive agent is used as a component for further enhancing a conducting path of an electrode and is used to provide conductivity to the electrode. Any suitable electronic conducting material that does not induce a chemical change in batteries can be used. Examples of the conductive agent include, but are not limited to carbonaceous materials, such as natural graphite, artificial graphite, carbon nano fibers, carbon black, acetylene black, ketchen black, or the like; and metal-based materials, such as copper (Cu), nickel (Ni), aluminum (Al), silver (Ag), or the like, in powder or fiber form.

In some embodiments, the filler is used as an auxiliary component for suppressing expansion of an electrode by increasing adhesion strength of the binder and is at least one selected from the group consisting of fibrous materials, such as fiberglass, carbon fiber, or metallic fiber, and the like.

<Solvent>

In some embodiments, water is used as the solvent for the binder composition. In other embodiments, the solvent is at least one selected from the group consisting of N,N-dimethylformamide, N,N-diethylacetamide, methylethyl ketone, cyclohexanone, ethyl acetate, butyl acetate, cellosolveacetate, propyleneglycol monomethylether acetate, methylcellosolve, butylcellosolve, methylcarbitol, butylcarbitol, propyleneglycol monomethylether, diethyleneglycol dimethylether, toluene, and xylene, and one or more of these solvents in combination with water. An amount of the solvent is not particularly limited, and in some embodiments, is selected in accordance with a desired viscosity of the slurry.

<Fabrication of Electrode>

In some embodiments, a slurry prepared using the binder composition for forming an electrode according to embodiments of the present invention and an active material, is coated on a current collector, and heated and dried under vacuum, thereby forming an electrode active material layer.

In some embodiments, coating of the slurry for forming the electrode is performed by one selected from the group consisting of screen printing, spray coating, doct blade coating, gravure coating, deep coating silk screening, painting, slot die coating, and the like, and can be selected according to the viscosity of the slurry.

In some embodiments, the current collector is formed with a thickness of 3 to 500 µm. In some embodiments, any current collector having suitable conductivity without inducing a chemical change in the secondary battery is used. Examples of the current collector include, but are not limited to copper, stainless steel, aluminum, nickel, titanium, sintered carbon, copper, stainless steel that is surface-treated with carbon, nickel, titanium, or silver, an aluminum-cadmium alloy, and the like.

In some embodiments, a negative electrode current collector is processed to have fine irregularities on surfaces thereof so as to enhance adhesive strength of the negative electrode current collector to the negative electrode active material, and can be used in various suitable form including films, sheets, foils, nets, porous structures, foams, and non-woven fabrics.

In some embodiments, the slurry is coated on the current collector, followed by drying. In some embodiments, in the drying, primary annealing is performed at a temperature in a range of 80 to 120° C. to evaporate a solvent (water or organic solvent) contained in the composition coated for forming the negative electrode active material layer.

In some embodiments, if the temperature of the primary annealing is less than 80° C., it can be difficult to remove water as the solvent from the electrode, which is not desirable. In some embodiments, if the temperature of the primary annealing is greater than 120° C., water as the solvent is rapidly evaporated, resulting in formation of bubbles on a surface of the electrode and reduction in the uniformity of the electrode surface, which is not desirable.

In some embodiments, the drying is performed under normal atmosphere.

In some embodiments, as a result of the primary annealing, the solvent of the composition for forming the negative electrode active material layer coated on the current collector is completely evaporated, followed by secondary annealing under vacuum.

In some embodiments, the secondary annealing is performed at a temperature in a range of 250° C. to 450° C. under vacuum in a range of $1\times10^{-4}$ torr to $1\times10^{-6}$ torr.

In some embodiments, as the electrode active material, specifically, as the positive electrode active material, a compound (lithiated intercalation compound), which allows reversible intercalation and deintercalation of lithium, is used. Specific examples of the positive electrode active material include but are not limited to at least one selected from the group consisting of lithium cobalt oxide represented by the formula $LiCoO_2$; lithium nickel oxide represented by the formula LiNiO2; lithium manganese oxide represented by the formula $Li_{1+x}Mn_{2-x}O_4$ (where x=0~0.33), $LiMnO_3$, $LiMn_2O_3$, or $LiMnO_2$; lithium copper oxide represented by the formula $Li_2CuO_2$; lithium iron oxide represented by the formula $LiFe_3O_4$; lithium vanadium oxide represented by the formula $LiV_3O_8$; copper vanadium oxide represented by the formula $Cu_2V_2O_7$; vanadium oxide represented by the formula $V_2O_5$; Ni-site lithium nickel oxide represented by the formula $LiNi_{1-x}M_xO_2$ (where M=Co, Mn, Al, Cu, Fe, Mg, B or Ga, x=0.01~0.3); lithium manganese composite oxide represented by the formula $LiMn_{2-x}M_xO_2$ (where M=Co, Ni, Fe, Cr, Zn or Ta, and x=0.01~0.1) or $Li_2Mn_3MO_8$ (where M=Fe, Co, Ni, Cu or Zn); lithium manganese oxide with some of Li in the formula $LiMn_2O_4$ substituted with alkali earth metal ions; disulfide compounds; and iron molybdenum oxide represented by the formula $Fe_2(MoO_4)_3$.

In some embodiments, as the electrode active material, specifically, as the negative electrode active material, crystalline carbon, amorphous carbon or a mixture thereof is used. Examples of the crystalline carbon include, but are not limited to shapeless, or sheet, flake, spherical, or fiber shaped natural graphite or artificial graphite. Examples of the amorphous carbon include, but are not limited to soft carbon (carbon obtained by sintering at a low temperature, hard carbon, mesophase pitch carbide, fired coke, and so on. In some embodiments, the negative electrode active material is selected from the group consisting of Si, $SiO_x$ (0<x<2), Sn, $SnO_2$, or Si alloyable metal, and mixtures thereof. Examples of the Si alloyable metal include, but are not limited to one or more selected from the group consisting of Al, Sn, Ag, Fe, Bi, Mg, Zn, in, Ge, Pb and Ti.

<Fabrication of Secondary Battery>

In an embodiment, a secondary battery is provided. In one embodiment, the secondary battery includes a positive electrode and a negative electrode and the binder according to embodiments herein described. In one embodiment, the secondary battery further includes a separator and a lithium salt-containing nonaqueous electrolyte, in addition to the positive electrode and the negative electrode.

In one embodiment, the separator is interposed between the positive electrode and the negative electrode. In one embodiment, an insulating thin film having high transmittance and mechanical strength is used as the separator. In one embodiment, the separator has pores having a diameter in a range of 0.01 to 10 µm and has a thickness of 5 to 300 µm. Examples of the separator include, but are not limited to an olefin-based polymer, such as polypropylene having chemical resistance and hydrophobicity; sheets or non-fabric made of fiberglass or polyethylene; and the like. In embodiments where a solid electrolyte, such as polymer, is used as the electrolyte, the solid electrolyte can also serve as the separator.

As a separator, specific examples of the olefin-based polymer include, but are not limited to polyethylene, polypropylene, polyvinylidene fluoride, and multiple layers (i.e. two or more layers) made of these materials. For example, the separator may be formed of combinations of multiple layers, including a polyethylene/polypropylene two-layered separator, a polyethylene/polypropylene/polyethylene three-layered separator, a polypropylene/polyethylene/polypropylene three-layered separator, and the like.

In some embodiments, the lithium salt-containing non-aqueous electrolyte includes a nonaqueous electrolyte and a lithium salt. Examples of the nonaqueous electrolyte include, but are not limited to an organic solvent electrolyte, an organic solid electrolyte, an inorganic solid electrolyte, and the like. Examples of the organic solvent electrolyte include, but are not limited to aprotic organic solvents, such as N-methyl-2-pyrrolidinone, propylene carbonate, ethylene carbonate, butylene carbonate, dimethyl carbonate, diethyl carbonate, γ-butyrolactone, 1,2-dimethoxyethane, 2-methyl tetrahydrofuran, dimethyl sulfoxide, 1,3-dioxolane, formamide, dimethyl formamide, dioxolane, acetonitrile, nitromethane, methyl formate, methyl acetate, a phosphoric triester, trimethoxy methane, dioxolane (or a derivative thereof), sulforane, methyl sulforane, 1,3-dimethyl-2-imidazolidinone, propylene carbonate (or a derivative thereof), tetrahydrofuran (or a derivative thereof), an ether, methyl propionate, or ethyl propionate.

Examples of the organic solid electrolyte include, but are not limited to polyethylene or a derivative thereof, polyethylene oxide or a derivative thereof, polypropylene oxide or a derivative thereof, phosphoric ester polymer, poly agitation lysin, polyester sulfide, polyvinyl alcohol, polyvinylidene fluoride, a polymer including an ionic dissociation group, and the like.

Examples of the inorganic solid electrolyte include, but are not limited to nitrides, halides or sulfates of lithium, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, or $Li_3PO_4$—$Li_2S$—$SiS_2$, or the like.

In some embodiments, the lithium salt is a material suitably dissolved in the nonaqueous electrolyte, and examples thereof include, but are not limited to LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, low-grade aliphatic carbonyl carbonate lithium, 4 phenyl boric lithium, imide, and the like. Additionally, in some embodiments, in order to improve charge/discharge characteristics and flame retardancy, for example, at least one of pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride and the like, are added to the non-aqueous electrolyte. In some embodiments, in order to reduce combustibility, the non-aqueous electrolyte further includes halogen-containing solvents such as carbon tetrachloride and/or ethylene trifluoride. Further, in some embodiments, in order to improve high-temperature storage characteristics, the non-aqueous electrolyte additionally includes carbon dioxide gas.

In one embodiment, the secondary battery including the electrode manufactured according to embodiments of the present invention is now described in more detail.

Figure 1:
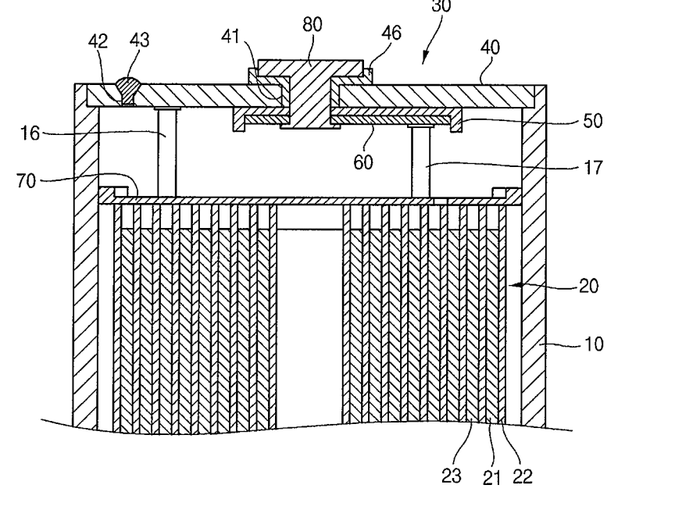
The drawing shows a cross-sectional view schematically illustrating a secondary battery according to an embodiment of the present invention.

The drawing is a cross-sectional view schematically illustrating a lithium secondary battery according to an embodiment of the present invention.

A method for fabricating the secondary battery according to an embodiment that follows is provided for a better understanding of the present invention, and may be varied, as would be understood by a person of skill in the related art.

Referring to the drawing, the lithium secondary battery according to an embodiment of the present invention includes a can 10, an electrode assembly 20, a cap assembly 30 and an electrolytic solution. The lithium secondary battery is manufactured by accommodating the electrode assembly 20 and the electrolytic solution in the can 10, and sealing a top end of the can 10 by the cap assembly 30.

The electrode assembly 20 includes a positive electrode plate 21, a negative electrode plate 23 and a separator 22. In an embodiment, the electrode assembly 20 is formed by sequentially stacking the positive electrode plate 21, the separator 22, the negative electrode plate 23 and the separator 22 and winding the resultant structure.

In one embodiment, the cap assembly 30 includes a cap plate 40, an insulation plate 50, a terminal plate 60 and an electrode terminal 80. The cap assembly 30 is coupled to the insulation case 70 and seals the can 10.

In one embodiment, the electrode terminal 80 is inserted into a terminal throughhole 41 formed at the center of the cap plate 40. When the electrode terminal 80 is inserted into the terminal throughhole 41, a tube-type gasket 46 coupled to the outer surface of the electrode terminal 80 is also inserted into the terminal throughhole 41. Therefore, the electrode terminal 80 is electrically insulated from the cap plate 40.

In one embodiment, after the cap assembly 30 is assembled to the top end of the can 10, the electrolytic solution is injected into the can 10 through an electrolytic solution injection hole 42. The electrolytic solution injection hole 42 is sealed by a separate plug 43. The electrode terminal 80 is connected to a negative electrode tab 17 of the negative electrode plate 23 or a positive electrode tab 16 of the positive electrode plate 21 and functions as a negative electrode terminal or a positive electrode terminal.

In addition, the lithium secondary battery according to an embodiment of the present invention can be fabricated in various suitable shapes, including but not limited to a cylinder type or pouch type as well as the illustrated prismatic type secondary battery.

Aspects of embodiments of the present invention are now described in more detail with reference to the following examples. These examples are provided only to illustrate the present invention by way of example and should not be construed as limiting the scope and spirit of the present invention.
<Preparation of Binder Composition>

PREPARATION EXAMPLE 1

Preparation of Emulsion Polymer Having Hydroxyl Group (A1)

In preparation of an emulsion polymer having one or more hydroxyl groups, water was used as a dispersion medium. In order to provide a polymerization reaction, monomers were separately put into a reaction vessel and an injection vessel to carry out the reaction in the following manner.

To the reaction vessel were injected 70 g of pure water, 1.0 g of 2-hydroxyethylacrylate, 8.40 g of n-butylacrylate, and 2.94 g of acrylonitrile as a monomer, 0.36 g of sodium dioctyl sulfosuccinate as an emulsifier, 6 mg of potassium persulfonate as a polymerization initiator, and 4 mg of sodium bisulfate as a molecular weight controlling agent, followed by agitating and mixing. To the injection vessel were injected 1.4 g of 2-hydroxyethylacrylate, 11.8 g of n-butylacrylate, and 4.1 g of acrylonitrile, followed by agitating and mixing. Nitrogen gas was injected into the agitated reaction vessel, and the temperature of the reaction vessel was raised up to 80° C., followed by slowly injecting the monomers contained in the injection vessel over a period of two hours. After the injecting was completed, the reaction was allowed to occur while maintaining the temperature of the reaction vessel at 80° C. for 30 minutes. Thereafter, the reaction vessel was cooled to reach room temperature, the emulsified polymer prepared in the reaction vessel was passed through a filter to remove some lumps from the reaction vessel, thereby preparing emulsion polymer having hydroxyl group with 30% solid.

Physical properties of the polymerized emulsion were analyzed, it was confirmed that the polymerized emulsion had an average particle size of 120 nm and an average weight molecular weight of 1,400,000 g/mol.

EXAMPLE 1

Fabrication of Battery Cell Using Positive Electrode 1

A positive electrode slurry was prepared in a slurry preparation vessel, the positive electrode slurry having a binder composition including 0.67 g of the emulsion polymer having hydroxyl group with 30% solid, prepared in Preparation Example 1, and 20 g of an aqueous solution of carboxymethyl cellulose sodium salt (Mw=330,000 g/mole) with 1% solid; 0.05 g of citric acid and 0.05 g of maleic anhydride as a polybasic acid compound; 24.0 g of $LiCoO_2$ (average particle size: 6.4 µm; specific surface area: 0.68 $m^2$/g) as a positive electrode active material; and 0.5 g of carbon nanofibers (CNF) (fiber length of 10 to 20 µm; fiber diameter of 160 nm; and specific surface area of 15 $m^2$/g) as a conductive agent. In order to adjust an appropriate viscosity of the positive electrode slurry, water was added in the course of preparing the positive electrode slurry.

The prepared positive electrode slurry was coated on an aluminum foil, primarily dried at 110° C. for 30 minutes, followed by punching, pressing, welding and drying in a vacuum oven at 200° C. for one hour to fabricate a coin cell, thereby manufacturing the positive electrode 1.

A half cell was fabricated using the fabricated positive electrode 1 for a lithium secondary battery and a Li metal counter electrode. Here, a mixed solution of ethylene carbonate having 1M $LiPF_6$ dissolved therein and diethylene carbonate (1:1 volume ratio) was used as an electrolyte. Cell fabrication was conducted in a glove box filled with argon gas.

COMPARATIVE EXAMPLE 1

Fabrication of Battery Cell Using Comparative Positive Electrode 1

The battery cell using a comparative positive electrode 1 was fabricated in the same manner as in Example 1, except that 0.83 g, instead of 0.67 g, of the emulsion polymer with 30% solid, prepared in Preparation Example 1 was used in preparing the positive electrode 1, and 25 g, instead of 20 g, of an aqueous solution of carboxymethyl cellulose sodium salt (Mw=330,000 g/mole) with 1% solid was used, and a polybasic acid compound was not used.

COMPARATIVE EXAMPLE 2

Fabrication of Battery Cell Using Comparative Positive Electrode 2

The battery cell using a comparative positive electrode 2 was fabricated in the same manner as in Example 1, except that 0.1 g of oxalic acid, instead of 0.05 g of citric acid and 0.05 g of maleic anhydride 0.05 g, was used as a polybasic acid compound in preparing the positive electrode 1.

EXAMPLE 2

Fabrication of Battery Cell Using Negative Electrode 1

A negative electrode slurry was prepared in a slurry preparation vessel, the negative electrode slurry having a binder composition including 10.0 g of poly(vinyl alcohol) (Average Mw=124,000-186,000 g/mol; and Degree of saponification (DS) of 87-89%), 6.0 g of poly(acrylic acid) with 5% solid as a water-soluble binder, 0.2 g of mellitic acid as a polybasic acid compound; and 19.0 g of mixed powder as a negative electrode active material, the mixed powder including Si alloy (Si—Fe—O component, commercially available from 3M and having an average particle size of 2.3 μm), $SiO_x$ (x=1, commercially available from OTC and having an average particle size of 5 μm) and graphite (artificial graphite commercially available from BTR and having an average particle size of 9.8 μm) mixed in ratios of $SiO_x$/graphite=5/95 and Si alloy/graphite=15/85). In order to adjust an appropriate viscosity of the negative electrode slurry, a small amount of water was added in the course of preparing the negative electrode slurry.

The prepared negative electrode slurry was coated on a copper foil, primarily dried at 110° C. for 30 minutes, followed by punching, pressing, welding and drying in a vacuum oven at 200° C. for one hour to fabricate a coin cell, thereby manufacturing the negative electrode 1.

A half cell was fabricated using the thus fabricated negative electrode 1 for a lithium secondary battery, a Li metal counter electrode and a porous polypropylene film as a separator. Here, a mixed solution of ethylene carbonate having 1M $LiPF_6$ dissolved therein and diethylene carbonate (1:1 volume ratio) was used as an electrolyte. Cell fabrication was conducted in a glove box filled with argon gas.

COMPARATIVE EXAMPLE 3

Fabrication of Battery Cell Using Comparative Negative Electrode 1

The battery cell using a comparative negative electrode 1 was fabricated in the same manner as in Example 2, except that 12 g, instead of 10.0 g, of the poly(vinyl alcohol) (Average Mw=124,000-186,000 g/mol; and Degree of saponification (DS) of 87-89%) with 5% solid, prepared in Preparation Example 2 was used in preparing the negative electrode 1, 8.0 g, instead of 6.0 g, of poly(acrylic acid) with 5% solid as a water-soluble binder was used, and a polybasic acid compound was not used.

COMPARATIVE EXAMPLE 4

Fabrication of Battery Cell Using Comparative Negative Electrode 2

The battery cell using a comparative negative electrode 2 was fabricated in the same manner as in Example 2, except that oxalic acid, instead of mellitic acid, was used as a polybasic acid compound in preparing the negative electrode 1.

EXPERIMENTAL EXAMPLE 1

Evaluation of Battery Cells Using Positive Electrodes

For one cycle, the cells fabricated in the Examples and the Comparative Examples to be subjected to evaluation of battery performance were fully charged at room temperature with a charge rate of 0.5 C at a constant current and a constant voltage until the charging voltage reached 4.2 V), and then discharged at the constant current of the same rate as that during charging until the discharging voltage reached 3.0 V.

A total of 50 cycles of charging and discharging were repeatedly performed to evaluate charging/discharging cycle characteristics. For more accurate evaluation, each of the 4 cells were fabricated under the same conditions, and were concurrently evaluated. The results of the evaluation are shown in Table 1.

TABLE 1

| | Initial Discharge Capacity (mAh/g) | Initial Discharge Capacity Retention (@50 cycles) (%) |
|---|---|---|
| Example 1 | 136 | 99.8% |
| Comparative Example 1 | 136 | 97.7 |
| Comparative Example 2 | 135 | 98.5 |

As can be seen from Table 1, the battery cell fabricated using the positive electrode 1 having a composition including a binder having hydroxyl group and a polybasic acid compound having three or more carboxyl groups, prepared in Example 1, exhibited improved initial discharge capacity retention at 50 cycles, compared to the battery cell fabricated using the comparative positive electrode 1, having a composition including only a binder having hydroxyl group. Accordingly, it is determined that carboxyl groups in the polybasic acid enhance the adhesion strength of an active material to a current collector and increases film strength through crosslinkage with the binder having hydroxyl group during a vacuum drying process, thereby improving the durability of the fabricated battery cell.

In addition, the battery cell fabricated using the positive electrode 1 prepared in Example 1, in which the polybasic acid compound includes citric acid and maleic anhydride, exhibited improved capacity retention, compared to the battery cell fabricated using the comparative positive electrode 2, prepared in Comparative Example 2, in which oxalic acid having two carboxyl groups was used as a polybasic acid compound. Accordingly, it is determined that the use of citric acid having three acidic groups increases a crosslinking density during a crosslinking reaction, compared to the use of oxalic acid having two acidic groups.

Further, it is also understood that the water-soluble polymer binder composition according to the present invention can be directly applied to environmentally friendly, water-based process while demonstrating improved battery performance.

EXPERIMENTAL EXAMPLE 2

Evaluation of Battery Cells Using Negative Electrodes

For one cycle, the cells fabricated in Examples and Comparative Examples to be subjected to evaluation of battery performance were fully charged at room temperature (25° C.) with a charge rate of 0.5 C at a constant current and a constant voltage until the charging voltage reached 0.5 V), and then discharged at the constant current of the same rate as that during charging until the discharging voltage reached 1.5 V.

A total of 50 cycles of charging and discharging were repeatedly performed to evaluate charging/discharging cycle characteristics. For more accurate evaluation, each 4 cells were fabricated under the same conditions, and were concurrently evaluated. The results of the evaluation are shown in Table 2.

TABLE 2

|  | Initial Discharge Capacity (mAh/cc) | Discharge Capacity Retention (@50 cycles) (%) |
|---|---|---|
| Example 3 | 1188 | 94% |
| Comparative Example 3 | 1182 | 82% |
| Comparative Example 4 | 1183 | 91% |

As can be seen from Table 2, results similar to those for the battery cells evaluated in Experimental Example 1 were obtained. That is to say, the battery cell fabricated using the negative electrode 1 having a composition including a binder having hydroxyl group and a polybasic acid compound having three or more carboxyl groups exhibited improved initial discharge capacity retention at 50 cycles, compared to the battery cell fabricated using the comparative negative electrode 1 having a composition including only a binder having hydroxyl group. Accordingly, it is determined that carboxyl groups in the polybasic acid enhance the adhesion strength of an active material to a current collector and increases film strength through crosslinkage with the binder having hydroxyl group during a vacuum drying process, thereby improving the durability of the fabricated battery cell, like in the positive electrode.

As to improvement in the life span (cycle life) owing to the use of a polybasic acid, the negative electrode exhibited a better life span characteristic than the positive electrode, suggesting that deformation of the negative electrode did not (or substantially did not) occur during expansion or shrinkage of a negative electrode active material by increased tensile strength due to a crosslinking reaction between the hydroxyl group of binder and the carboxyl group of polybasic acid, thereby improving the life span characteristic.

In addition, in a case of using polybasic acid, polybasic acid having three carboxyl groups demonstrated better performance than polybasic acid having two carboxyl groups.

While the present invention has been described in connection with certain embodiments, it is to be understood that the invention is not limited to the disclosed embodiments, but, rather is intended to cover various modifications and equivalent arrangements included within the spirit and scope of the appended claims, and equivalents thereof.

What is claimed is:

1. A binder composition for an electrode, comprising:
   a first polymer having one or more hydroxyl groups in its repeating unit; and
   a polybasic acid compound,
   wherein the polybasic acid compound is a compound having three or more carboxyl groups
   wherein the first polymer comprises at least one polymer selected from the group consisting of carboxymethylcellulose, carboxyethylcellulose, ethylcellulose, hydroxymethylcellulose, hydroxyethylcellulose, hydroxypropylcellulose, polyvinyl alcohol, and salts thereof, and/or wherein the first polymer comprises one or more copolymers prepared by copolymerizing a monomer having a hydroxyl group and a monomer having no hydroxyl group, wherein the monomer having the hydroxyl group is selected from at least one of 2-hydroxyethylmethacrylate, 2-hydroxymethylmethacrylate, 3hydroxypropylacrylate, and 3-hydroxyproplmethacrylate.

2. The binder composition of claim 1, wherein the first polymer is soluble in water.

3. The binder composition of claim 1, wherein the polybasic acid compound comprises at least one compound selected from the group consisting of a tricarboxylic acid selected from methane tricarboxylic acid, ethane tricarboxylic acid, citric acid, benzene-1,3,5-tricarboxylic acid, and 5-sulfo-1,2,4-benzenetricarboxylic acid; a tetracarboxylic acid selected from ethane-1,1,2,2-tetracarboxylic acid, propane-1,1,2,3-tetracarboxylic acid, butane-1,2,3,4-tetracarboxylic acid, cyclopentane-1,2,3,4-tetracarboxylic acid, and benzene-1,2,4,5-tetracarboxylic acid; benzene-1,2,3,4,5-pentacarboxylic acid; benzene-1,2,3,4,5,6-hexacarboxylic acid (mellitic acid); an aliphatic dianhydride selected from 1,2,3,4-cyclobutane tetracarboxylic dianhydride, 1,2,3,4-cyclopentane tetracarboxylic dianhydride and 5-(2,5-dioxotetrahydrofuril)-3-methylcyclohexane-1,2-dicarboxylic dianhydride; an alkylene glycolbisanhydrotrimellitate selected from trimellitic anhydride, pyromellitic dianhydride, ethylene glycolbisanhydrotrimellitate, propylene glycolbisanhydrotrimellitate, 1,4-butanediolbisanhydrotrimellitate, hexamethylene glycolbisanhydrotrimellitate, polyethylene glycolbisanhydrotrimellitate, and polypropylene glycolbisanhydrotrimellitate; an aromatic acid dianhydride compound and an aromatic-aliphatic combination type acid dianhydride compound selected from 3,3',4,4'-benzophenonetetracarboxylic anhydride, 3,3',4,4'-biphenyltetracarboxylic anhydride, 1,2,5,6-naphthalene tetracarboxylic anhydride, 1,4,5,8-naphthalene tetracarboxylic anhydride, 2,3,5,6-pyridine tetracarboxylic anhydride, 3,4,9,10-periylene tetracarboxylic anhydride, 3,3',4,4'-diphenylsulfone tetracarboxylic anhydride, m-terphenyl-3,3',4,4'-tetracarboxylic anhydride, 4,4'-oxydiphthalc dianhydride, 1,1,1,3,3,3-hexafluoro-2,2-bis(2, 3- or 3,4-dicarboxyphenyl)propane dianhydride, 2,2-bis(2,3- or 3,4-dicarboxyphenyl)propane dianhydride, 2,2-bis[4-(2,3- or 3,4-dicarboxyphenoxy)phenyl]propane dianhydride, 1,1,1,3,3,3-hexafluoro-2,2-bis[4-(2,3- or 3,4-dicarboxyphenoxy)phenyl]propane dianhydride, and 1,3-bis(3,4-dicarboxyphenyl)-1,1,3,3-tetramethyldisiloxane dianhydride.

4. The binder composition of claim 1, wherein the first polymer and the polybasic acid compound are in an amount of 1 to 50 parts by weight of the polybasic acid compound based on 100 parts by weight of the first polymer.

5. The binder composition of claim 1, wherein the binder composition further comprises a second polymer, the second polymer being a water-based binder.

6. The binder composition of claim 5, wherein the first polymer is in an amount of 20 to 100 parts by weight based on a total weight of the first polymer and the second polymer.

7. The binder composition of claim 5, wherein the second polymer comprises at least one selected from the group consisting of polyacrylic acid, polymethacrylic acid, polyacrylic acid copolymer, polymethacrylic acid copolymer, polyacrylamide, polyacrylamide copolymer, (denatured) butadiene-based rubber emulsion, (denatured) styrene-butadiene-based rubber emulsion, and (denatured) urethane-based rubber emulsion.

8. The binder composition of claim 1, further comprising at least one additive selected from the group consisting of a crosslinking promoter, a dispersing agent, a thickener, a conductive agent and a filler.

9. The binder composition of claim 8, wherein the additive is in an amount of 0.1 to 10 parts by weight based on 100 parts by weight of the binder composition, not including a solvent.

10. The binder composition of claim 8, wherein the crosslinking promoter is an acid having higher acidity than a carboxylic acid.

11. The binder composition of claim 10, wherein the crosslinking promoter is an organic sulfonic acid.

12. The binder composition of claim 1, wherein the binder composition further comprises at least one solvent selected from the group consisting of water, N,N-dimethylformamide, N,N-dimethylacetamide, methylethylketone, cyclohexanone, aceticethyl, aceticbutyl, cellosolveacetate, propyleneglycol monomethylether acetate, methylcellosolve, butylcellosolve, methylcarbitol, butylcarbitol, propyleneglycol monomethylether, diethyleneglycol dimethylether, toluene, and xylene.

13. An electrode for a secondary battery, comprising:
an electrode current collector;
an electrode active material; and
the binder composition of claim 1.

14. A secondary battery comprising:
a positive electrode;
a negative electrode;
a separator between the positive electrode and the negative electrode; and
an electrolytic solution,
wherein at least one of the positive electrode or the negative electrode is the electrode of claim 13.

15. An electrode for a secondary battery, comprising:
an electrode current collector;
an electrode active material; and
the binder composition of claim 2.

16. A secondary battery comprising:
a positive electrode;
a negative electrode;
a separator between the positive electrode and the negative electrode; and
an electrolytic solution,
wherein at least one of the positive electrode or the negative electrode is the electrode of claim 15.

* * * * *